US011250349B2

(12) United States Patent
Kim et al.

(10) Patent No.: US 11,250,349 B2
(45) Date of Patent: Feb. 15, 2022

(54) SYSTEM FOR GENERATING LEARNING DATA

(71) Applicant: DOOSAN HEAVY INDUSTRIES & CONSTRUCTION CO., LTD., Changwon-si (KR)

(72) Inventors: Hyun Sik Kim, Gimpo-si (KR); Jee Hun Park, Gwangmyeong-si (KR)

(73) Assignee: DOOSAN HEAVY INDUSTRIES & CONSTRUCTION CO., LTD., Changwon-si (KR)

(*) Notice: Subject to any disclaimer, the term of this patent is extended or adjusted under 35 U.S.C. 154(b) by 377 days.

(21) Appl. No.: 16/402,260

(22) Filed: May 3, 2019

(65) Prior Publication Data
US 2019/0354893 A1    Nov. 21, 2019

(30) Foreign Application Priority Data
May 16, 2018   (KR) .................. 10-2018-0056069

(51) Int. Cl.
*G06N 20/00*        (2019.01)

(52) U.S. Cl.
CPC .................................... *G06N 20/00* (2019.01)

(58) Field of Classification Search
CPC .................................................... G06N 20/00
See application file for complete search history.

(56) References Cited

U.S. PATENT DOCUMENTS

| 9,390,112 | B1* | 7/2016 | Daly | G06F 16/2365 |
|---|---|---|---|---|
| 9,454,733 | B1* | 9/2016 | Purpura | G06N 20/00 |
| 10,810,463 | B2* | 10/2020 | Min | G06F 16/213 |
| 2016/0123238 | A1* | 5/2016 | Kay | F01D 9/041 |
| | | | | 415/1 |

FOREIGN PATENT DOCUMENTS

| JP | 2009-198136 A | 9/2009 |
|---|---|---|
| JP | 2012-058890 A | 3/2012 |
| KR | 2006-0063752 A | 6/2006 |
| KR | 10-0682935 B1 | 2/2007 |

OTHER PUBLICATIONS

Seiffert et al., RUSBoost: A Hybrid Approach to Alleviating Class Imbalance, Jan. 1, 2010, IEEE Explore, IEEE Transactions on Systems, Man, and Cybernetics—Part A: Systems and Humans, vol. 40, No. 1, pp. 185-197 (Year: 2010).*
A Korean Office Action dated Oct. 22, 2019 in connection with Korean Patent Application No. 10-2018-0056069.

* cited by examiner

Primary Examiner — Daniel T Pellett
(74) Attorney, Agent, or Firm — Invenstone Patent, LLC

(57) ABSTRACT

A system for generating learning data is provided. The system for generating the learning data includes a data incorporating part configured to generate new data by filtering plant data based on a warning condition to incorporate the plant data for one configuration of a plant into existing learning data and a learning data generating part configured to differentiate a weight applied to the new data and the existing learning data, respectively, by comparing the number of the new data and the number of the existing learning data, and generate new learning data by combining the new data with the existing learning data to which the weight is applied.

17 Claims, 5 Drawing Sheets

SYSTEM FOR GENERATING LEARNING DATA

CROSS-REFERENCE TO RELATED APPLICATIONS

This application claims priority from Korean Patent Application No. 10-2018-0056069, filed on May 16, 2018, the disclosure of which is incorporated herein by reference in its entirety.

BACKGROUND

Field

Apparatuses and methods consistent with exemplary embodiments relate to a system for generating learning data, and more particularly, to a system for generating new learning data by differentiating a weight applied to existing learning data and new data, respectively.

Description of the Related Art

Generally, large plants such as power generation or chemistry are operated by complexly connected various kinds of machines and electric equipments. Those large plants should always monitor an abnormal symptom leading to accidents in order to stably supply power by securing reliability. Therefore, a monitoring device for detecting whether a major component constituting a plant is damaged in real time and for generating an alarm to a driver when an abnormal symptom is found in the component is being used.

That is, a failure of a process in the plant can cause undesired performance due to damage to the plant. Further, when the plant is destroyed, it can cause injury or death of a person, and also cause environmental problems. Therefore, an early warning system capable of detecting the failure early is indispensable.

The early warning system that early notifies a failure or a possibility of failure is required to receive and store a real-time observation signal from the plant, and based on the above, to distinguish the abnormal signals to notify it in advance. Therefore, the most important part of a failure detecting system can be a failure prediction model capable of early predicting the failure. The failure prediction model can predict the steady state of the plant accurately, and predict an occurrence of a failure when an observation signal different from the steady state is received.

In order for the failure prediction model to operate accurately, learning data with good quality is needed. That is, it is possible to perform learning for the steady state by using the learning data with good quality, thereby increasing accuracy of the failure prediction model. Therefore, it is important to secure the learning data with good quality for an accurate failure prediction model.

However, when an unskilled person performs the prediction modeling, the learning data may be erroneously generated by erroneously performing pre-processing of data and other processing. As a result, an accuracy of the prediction is significantly reduced, thereby deteriorating performance of the solution.

SUMMARY

Aspects of one or more exemplary embodiments provide a system for generating learning data, which extracts only the data suitable for generating learning data by an early warning condition even if a user selects any data, and generates new learning data with high reliability by adjusting a reflection ratio of new data and existing learning data.

Additional aspects will be set forth in part in the description which follows and, in part, will be apparent from the description, or may be learned by practice of the exemplary embodiments.

According to an aspect of an exemplary embodiment, there is provided a system for generating learning data, the system including: a data incorporating part configured to generate new data by filtering plant data based on a warning condition to incorporate the plant data for one configuration of a plant into existing learning data; and a learning data generating part configured to differentiate a weight applied to the new data and the existing learning data, respectively, by comparing the number of the new data and the number of the existing learning data, and generate new learning data by combining the new data with the existing learning data to which the weight is applied, wherein the learning data generating part determines whether the number of the existing learning data is equal to or greater than or less than a first designed value, and changes a weight applied to the new data and the existing learning data, respectively, according to the number of the new data and the number of the existing learning data.

According to an aspect of an exemplary embodiment, the system for generating learning data can generate learning data with high reliability by determining a reflection ratio between the existing learning data and the new data, and recommend it to the user. In addition, the system for generating the learning data can classify the data that has been used in the prediction model and the data that has not been used in the prediction model to perform the filtering procedure twice, thereby automatically filtering the data with low reliability even if an unskilled person erroneously selects data.

BRIEF DESCRIPTION OF THE DRAWINGS

The above and other aspects will become more apparent from the following description of the exemplary embodiments with reference to the accompanying drawings, in which.

DETAILED DESCRIPTION OF EXEMPLARY EMBODIMENTS

Figure 1:
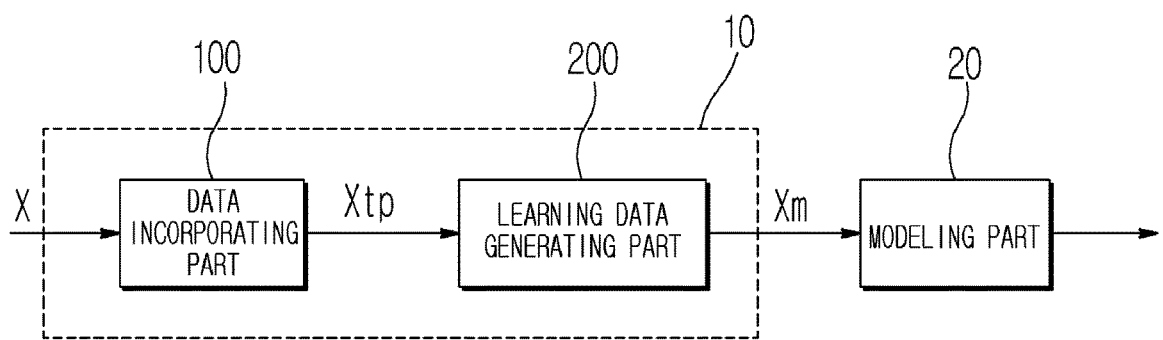
FIG. 1 is a block diagram illustrating a learning system including a system for generating learning data according to an exemplary embodiment.

The inventive concept will be described in detail later with reference to the accompanying drawings, in which exemplary embodiments thereof are shown. However, the inventive concept should be not limited to the embodiments set forth below but can be implemented in many different forms. Rather, the exemplary embodiments are only provided to complete description of the present disclosure and to completely convey the scope of the inventive concept to those skilled in the art to which the present disclosure pertains. The same reference numerals denote the same elements throughout the specification.

FIG. 1 is a block diagram illustrating a learning system including a system for generating learning data according to an exemplary embodiment.

Referring to FIG. 1, the learning system may include a system for generating learning data 10 and a modeling part 20.

The system for generating the learning data 10 may include a data incorporating part 100 and a learning data generating part 200. The system for generating the learning data 10 may generate data for generating a plant prediction model, and generate new learning data Xm based on measured data for various parameters of one configuration of the plant (e.g., the amount of power of the plant, the temperature of one configuration of the plant, and the like). The system for generating the learning data 10 can generate the new learning data Xm with high reliability by appropriately determining a reflection ratio between existing learning data and new data, and recommend it to a user. The system for generating the learning data 10 may be designed based on a reflection ratio between the existing learning data and the new data and an algorithm for various scenarios, and may generate the learning data with high reliability even when the user is an unskilled person in the task of generating the learning data.

The data incorporating part 100 can filter plant data to incorporate the plant data X for one configuration of the plant into the existing learning data. For example, the data incorporating part 100 can filter abnormal data, None/Null data, data with low reliability, and the like, which are present in the plant data X. The abnormal data may be damaged data, the None/Null data may be data having a value of 0, and the data with low reliability may be a pattern deviating from a pattern in which most data are distributed. The data incorporating part 100 can generate a learning data candidate group Xtp by combining the existing learning data with the filtered plant data. The learning data candidate group Xtp can be transmitted to the learning data generating part 200.

The learning data generating part 200 can generate the new learning data Xm by sampling the learning data candidate group Xtp. The learning data generating part 200 can differentiate a weight applied to the filtered plant data and the existing learning data, respectively, and generate the new learning data Xm. The plant data X by which filtering has been completed may be new data, which will be described later.

The modeling part 20 can generate a plant prediction model by modeling the generated new learning data Xm. The modeling part 20 can update an existing plant prediction model by receiving the new learning data Xm at a predetermined cycle and performing a plant modeling. In addition, the modeling part 20 can generate a new plant prediction model based on the new learning data Xm received from the system for generating the learning data 10.

Figure 2:
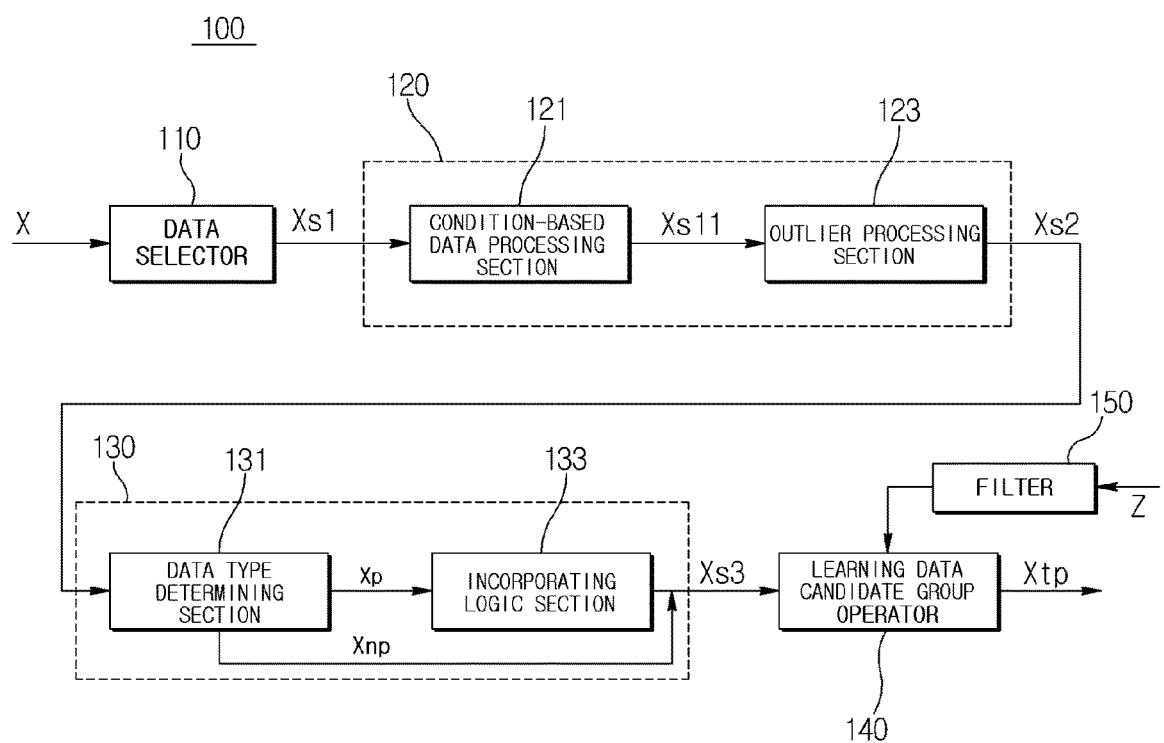
FIG. 2 is a block diagram illustrating a data incorporating part according to an exemplary embodiment.
Figure 3:
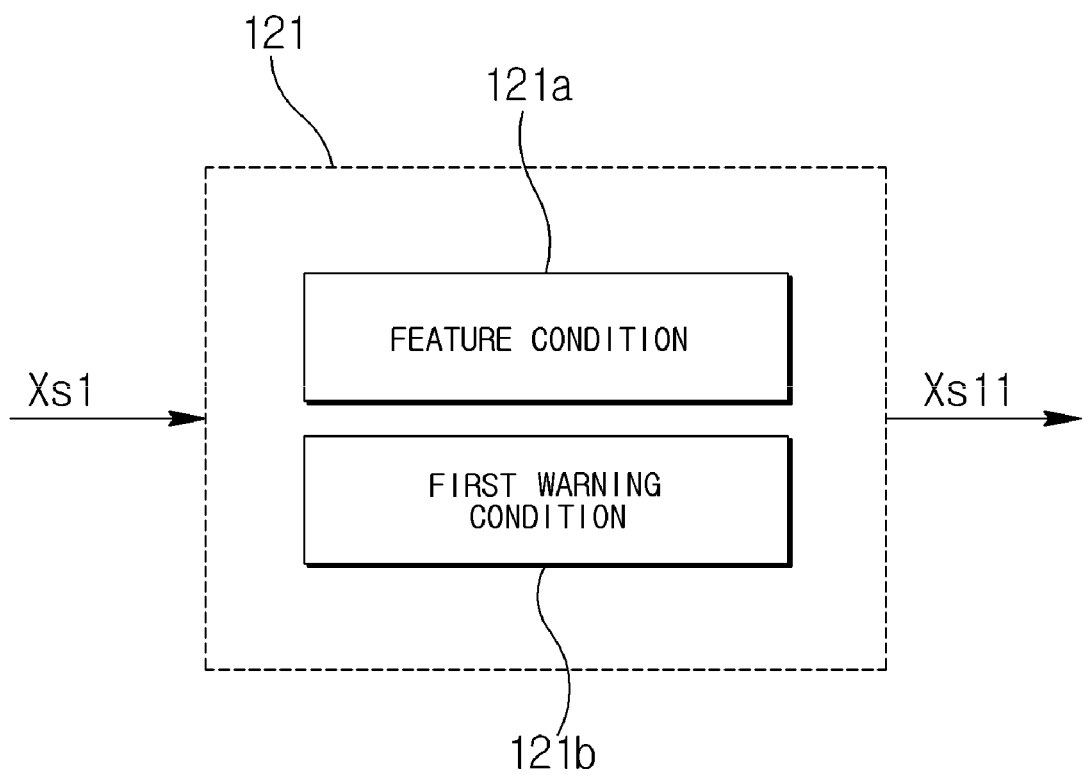
FIG. 3 is a block diagram illustrating a condition-based data processing section of FIG. 2.

FIG. 2 is a block diagram illustrating the data incorporating part 100 according to an exemplary embodiment, and FIG. 3 is a block diagram illustrating a condition-based data processing section of FIG. 2.

Referring to FIGS. 1 to 3, the data incorporating part 100 may include a data selector 110, a data processor 120, a data incorporation determiner 130, a learning data candidate group operator 140, and a filter 150.

The data selector 110 can select data measured for a specific period from the plant data X. For example, the data selector 110 can select the plant data X from January to March among one year. In addition, the data selector 110 can select some of parameters that should be essentially considered for generating the prediction model of the plant. For example, the data selector 110 can select some of the parameters such as a minimum output, a maximum output, a turbine speed, a temperature, humidity, and a pressure. That is, the system for generating the learning data 10 can generate learning data based on the data selected by the data selector 110. The plant data X selected by the data selector 110 is defined as a first plant data Xs1. The data selector 110 can be controlled by the user, and the user can select the data for a desired period or parameter.

The data processor 120 may include a condition-based data processing section 121 and an outlier processing section 123. The data processor 120 can filter the first plant data Xs1, and the filtered first plant data Xs1 is defined as a first sub-plant data Xs11. The data processor 120 can remove the None/Null data included in the plant data X.

The condition-based data processing section 121 may include a feature condition-based processor 121a and a first warning condition-based processor 121b. The plant data X from which the None/Null data has been removed can be filtered by the feature condition-based processor 121a and the first warning condition-based processor 121b.

The feature condition-based processor 121a can filter the first plant data Xs1 based on a parameter indicating a feature of the plant. For example, the feature condition can be the data that is equal to or less than a specific output value of one configuration of the plant, and the feature condition-based processor 121a can filter the data indicating a case in which the output value is equal to or greater than a specific reference. That is, the feature condition-based processor 121a can use only the data satisfying the feature condition to generate learning data. The first warning condition-based processor 121b can filter the first plant data Xs1 by using a first warning condition. Specifically, the first warning condition-based processor 121b can filter the data outside the allowable range of an actually measured value based on the actually measured value of the first plant data Xs1. That is, the first warning condition can be a condition for filtering the data outside the allowable range of the actually measured value based on the actually measured value of the first plant data Xs1. The actually measured value can be the measured data for a parameter (e.g., the amount of power of the plant, the temperature of one configuration of the plant, or the like) for one configuration of the plant, and the allowable range of the actually measured value may be the data having a value between an upper limit of the actually measured value and a lower limit of the actually measured value. The first warning condition-based processor 121b can output a warning when the first plant data Xs1 exceeds the allowable range allowed by the first warning condition. The data after the warning has been output is determined to be low reliability and cannot be used to generate the learning data.

The outlier processing section 123 can filter highly problematic data to be used for generating the learning data. The outlier processing section 123 can filter the data that has not been filtered by the condition-based data processing section 121 but deviates from the normal distribution formed by most data. That is, the outlier processing section 123 can remove an outlier, which is the data that is normal data but deviates from the general data distribution. The first sub-plant data Xs11 from which the outlier has been removed is defined as a second plant data Xs2.

The data incorporation determiner 130 may include a data type determining section 131 and an incorporation logic section 133. The data incorporation determiner 130 can determine whether the second plant data Xs2 is used by the prediction model, and filter the second plant data Xs2 based on a second warning condition when the second plant data Xs2 is used by the prediction model.

The data type determining section 131 can determine whether the second plant data Xs2 is used by the prediction model. The data that is used by the prediction model among the second plant data Xs2 is defined as a prediction model data Xp, and the data is not used by the prediction model among the second plant data Xs2 is defined as a non-prediction model data Xnp. The prediction model data Xp can be the data included in the existing learning data as the data having prediction information. Herein, the prediction model may be a model generated based on the existing learning data, or a model previously constructed by a designer. For example, when the data selector 110 selects data from January to June among 12 months and uses data from April to June in generating the prediction model, the data from January to March is the non-prediction model data Xnp, and the data from April to June is the prediction model data Xp.

The incorporation logic section 133 can filter the prediction model data Xp based on the second warning condition. The incorporation logic section 133 can define as a residual that is obtained by subtracting a predicted value from an actually measured value by defining the prediction model data Xp as the actually measured value and defining the data obtained through the prediction model as the predicted value. The incorporation logic section 133 can filter the data outside the allowable range of the residual. The allowable range of the residual may be the data having a value between an upper limit of the residual and a lower limit of the residual. The incorporation logic section 133 can output a warning when the prediction model data Xp exceeds the allowable range allowed by the second warning condition. In general, the warning condition can be changed with the passage of time, and the second warning condition may be the present warning condition. For example, the warning conditions for January and June can become different from each other. When the prediction model data Xp is the data from January to June and it is in July at present, the second warning condition may be a warning condition that has been set based on July. That is, the second warning condition can be a condition that filters the data outside the allowable range of the residual based on the residual of the prediction model data Xp and reflects the present warning condition. The present warning condition can be changed by the designer and the present time.

The prediction model data Xp filtered by the incorporation logic section 133 and the non-prediction model data Xnp can be combined to generate new data Xs3. The new data Xs3 can be data used to generate the new learning data Xm as the data by which filtering has been completed.

The learning data candidate group operator 140 can generate the learning data candidate group Xtp for generating the new learning data Xm by combining the existing learning data Z with the new data Xs3. At this time, some data of the existing learning data Z are filtered by the filter 150 to be transmitted to the learning data candidate group operator 140. The filter 150 can filter the existing learning data Z outside the allowable range of the actually measured value of the new data Xs3. The filter 150 can filter the existing learning data Z to match the first warning condition of the new data Xs3 in order to combine the existing learning data Z with the new data Xs3. For example, because some data of the existing learning data Z can have the data deviating from the general distribution of the new data Xs3, only the existing learning data Z having the distribution similar to the new data Xs3 through the procedure of filtering the existing learning data Z can be used as the learning data candidate group Xtp. Ideally, the filter 150 can filter so that the number of the existing learning data Z becomes 2000. However, when the number of the existing learning data Z is smaller than 2000, the number of the existing learning data Z included in the learning data candidate group Xtp can be smaller than 2000. That is, the number of the existing learning data Z included in the learning data candidate group Xtp cannot also be 2000.

The data incorporating part 100 according to an exemplary embodiment can filter the plant data X by using the first warning condition based on the actually measured value and the second warning condition based on the residual. The data incorporating part 100 can filter the plant data X based on the allowable range of the actually measured value (i.e., the first warning condition), and filter only the prediction model data Xp that has been used in the prediction model of the allowable range of the residual (i.e., the second warning condition). Therefore, the data incorporating part 100 can distinguish between the data that has been used by the prediction model and the data that has not been used by the prediction model even if the user selects the plant data X measured in a certain period. The data incorporating part 100 can filter the prediction model data Xp by using the predicted value through the prediction model of the data that has been used by the prediction model once again. Therefore, the new data Xs3 with high reliability can be generated. That is, the data incorporating part 100 can be a general-purpose algorithm for the warning.

Figure 4:
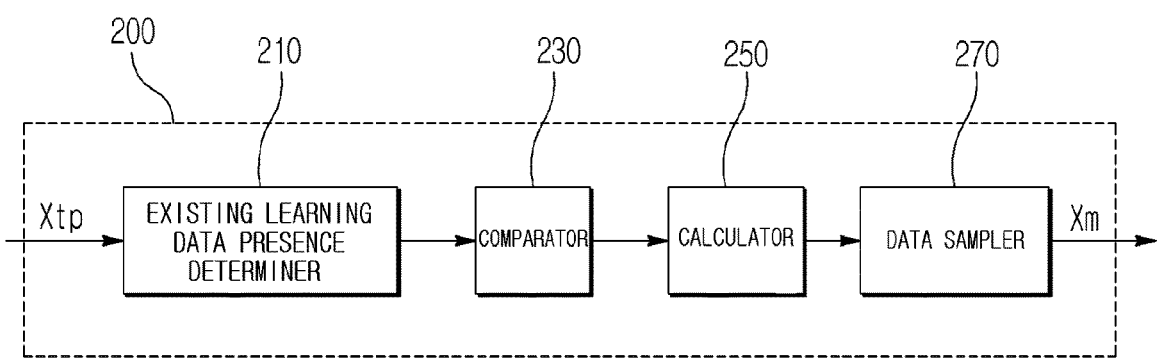
FIG. 4 is a block diagram illustrating a learning data generating part according to an exemplary embodiment.

FIG. 4 is a block diagram illustrating a learning data generating part according to an exemplary embodiment.

Referring to FIG. 4, the learning data generating part 200 may include an existing learning data presence determiner 210, a comparator 230, a calculator 250, and a data sampler 270. Although the learning data generating part 200 is described by dividing into various configurations for convenience of explanation, the learning data generating part 200 can be understood as an algorithm for generating learning data.

The existing learning data presence determiner 210 can determine whether the existing learning data Z is present. When the existing learning data Z is present, the learning data generating part 200 can combine the existing learning data Z with the new data Xs3 by differentiating a weight applied to the existing learning data Z and the new data Xs3, respectively, based on a ratio between the existing learning data Z and the new data Xs3. When the existing learning data Z is not present, the learning data generating part 200 can generate the new learning data Xm by using only the new data Xs3.

The comparator 230 can compare whether the number of the existing learning data Z is equal to or greater than, or less than a first designed value. The first designed value can be the number of the ideal learning data determined by the designer. Therefore, it can be preferable that the number of the existing learning data Z satisfies the first designed value, and the number of the generated new learning data Xm satisfies the first designed value. For example, the first designed value can be 2000.

The calculator 250 can calculate a ratio S of the new data Xs3 to the existing learning data Z, and calculate a weight applied to the new data Xs3 and the existing learning data Z, respectively, based on the ratio S. The calculator 250 can calculate a size (the number of data) of each of the new data Xs3 and the existing learning data Z in order to calculate the ratio S and the weight. The ratio S can be expressed as $$S = \frac{\text{the size of } Xs3}{\text{the size of } Z}.$$

The weights applied to the new data Xs3 and the existing learning data Z can become different from each other according to the ratio S. The calculator 250 may determine the weights applied to the new data Xs3 and the existing learning data Z by using the size of each of the new data Xs3 and the existing learning data Z and the ratio S. However, when the number of the new data Xs3 is equal to or less than a second designed value, the weight applied to the new data Xs3 can be calculated as 1. For example, the second designed value can be 500. In an exemplary embodiment, a maximum value of the weight applied to the data is defined as 1. That is, when the number of the new data Xs3 is equal to or less than the second designed value, the calculator 250 calculates the weight applied to the new data Xs3 as 1 regardless of the ratio S.

The data sampler 270 can sample the new data Xs3 and the existing learning data Z based on the ratio S and the weight. Ideally, the data sampler 270 can sample the new data Xs3 and the existing learning data Z so that the number of the existing learning data Z applied to the new learning data Xm is greater than the number of the new data Xs3 applied to the new learning data Xm. However, when the sum of the number of the new data Xs3 and the number of the existing learning data Z is equal to or less than the first designed value, the data sampler 270 cannot perform the sampling procedure.

For example, when the number of the existing learning data Z is 2000, the new data Xs3 and the existing learning data Z can be sampled based on whether the ratio S is equal to or greater than, or less than 0.25. When the ratio S is 0.25, the data sampler 270 can sample the existing learning data Z so that the number of the existing learning data Z becomes 1500, and cannot sample the new data Xs3. As a result of the sampling, the number of the existing learning data Z becomes 1500, and the number of the new data Xs3 becomes 500. That is, the data sampler 270 can sample so that the sum of the number of the existing learning data Z and the number of the new data Xs3 becomes a number that is equal to the first designed value. At this time, the calculator 250 can calculate the weight applied to the new data Xs3 as 1. The data sampler 270 can reflect all of the new data Xs3 and sample only the existing learning data Z.

In another example, when the number of the existing learning data Z is less than 2000, the new data Xs3 and the existing learning data Z can be sampled so that the ratio S satisfies 0.25. When the number of the existing learning data Z is 1600 and the number of the new data Xs3 is 600, the data sampler 270 can sample the existing learning data Z so that the number of the existing learning data Z becomes 1500, and sample the new data Xs3 so that the number of the new data Xs3 becomes 500. However, when the number of the new data Xs3 is less than the second designed value, the data sampler 270 can sample only the existing learning data Z without sampling the new data Xs3.

In still another example, when the number of the existing learning data Z is less than a first setting value, the data sampler 270 can perform the sampling procedure based on whether the number of the new data Xs3 is equal to or greater than, or less than the second designed value without considering the ratio S. For example, the first setting value can be 1500. When the number of the existing learning data Z is the first designed value, the first setting value is defined as a value when the ratio of the first designed value to the existing learning data Z is ¾. When the number of the existing learning data Z is 1000 and the number of the new data Xs3 is 600, the data sampler 270 cannot sample the existing learning data Z and the new data Xs3. This is because the sum of the number of the existing learning data Z and the number of the new data Xs3 is less than the first designed value. When the number of the existing learning data Z is 1400 and the number of the new data Xs3 is 800, the calculator 250 can calculate the weight applied to the existing learning data Z as 1. The data sampler 270 can sample the new data Xs3 so that the number of the new data Xs3 becomes 600 without sampling the existing learning data Z.

There can be various scenarios in the procedure of calculating the weight by the calculator 250 and the procedure of sampling by the data sampler 270. These will be described in detail in FIG. 5.

Figure 5:
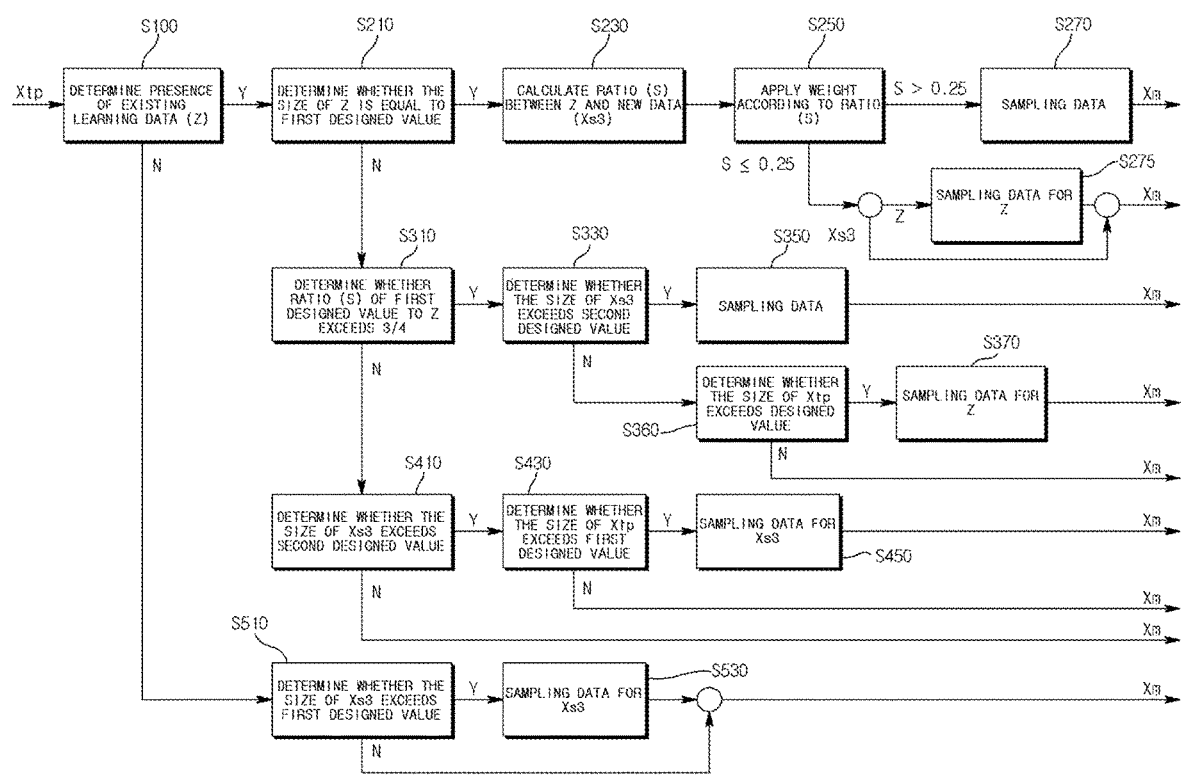
FIG. 5 is a diagram for explaining a procedure of generating learning data through the learning data generating part of FIG. 4.

FIG. 5 is a diagram for explaining a procedure of generating learning data through the learning data generating part 200 of FIG. 4. In an exemplary embodiment according to FIG. 5, the first designed value can be 2000, the second designed value can be 500, and the first setting value can be 1500. In the exemplary embodiment of FIG. 5, the size of the data may be the number of the data.

Referring to FIGS. 4 and 5, the learning data generating part 200 can differentiate the weight applied to the new data Xs3 and the existing learning data Z, respectively, by comparing the number of the new data Xs3 with the number of the existing learning data Z, and generate the new learning data Xm by combining the new data Xs3 with the existing learning data Z to which the weights have been applied. The learning data generating part 200 can determine whether the number of the existing learning data Z is equal to or greater than, or less than the first designed value, and change the weight applied to the new data Xs3 and the existing learning data Z, respectively, according to the number of the new data Xs3 and the number of the existing learning data Z.

The existing learning data presence determiner 210 that receives the learning data candidate group Xtp can determine whether the existing learning data Z included in the learning data candidate group Xtp is present (operation S100).

The comparator 230 can determine whether the number of the existing learning data Z is equal to the first designed value (operation S210). The first designed value can be the number of the ideal learning data determined by the designer.

When the number of the existing learning data Z is equal to the first designed value, the calculator 250 can calculate the number of the new data Xs3 and the number of the existing learning data Z, and calculate the ratio S between the existing learning data Z and the new data Xs3 (operation S230). The calculator 250 can differentiate the weight applied to the new data Xs3 and the existing learning data Z, respectively, according to the ratio S (operation S250).

When the ratio S is greater than 0.25, the calculator 250 can calculate a weight so that the number of the existing learning data Z becomes the first setting value and the number of the new data Xs3 becomes the second designed value. The data sampler 270 can sample the existing learning data Z so that the number of the existing learning data Z becomes the first setting value and sample the new data Xs3 so that the number of the new data Xs3 becomes the second designed value. The data sampler 270 can generate the new learning data Xm by combining the sampled existing learning data Z with the sampled new data Xs3. When the number of the existing learning data Z is equal to or greater than the first designed value and the ratio S is greater than 0.25, the first setting value can be equal to the number of the existing learning data Z included in the new learning data Xm (operation S270).

When the ratio S is equal to or less than 0.25, the calculator 250 can define the weight applied to the new data Xs3 as 1. That is, all the new data Xs3 can be applied to generate the new learning data Xm. In other words, the data sampler 270 can sample only the existing learning data Z without sampling the new data Xs3, and generate the new learning data Xm by combining the sampled existing learning data Z with the new data Xs3. When the number of the existing learning data Z is equal to or greater than the first designed value and the ratio S is equal to or less than 0.25, the first setting value can be less than the number of the existing learning data Z included in the new learning data Xm (operation S275).

When the number of the existing learning data Z is less than the first designed value, the calculator 250 can calculate whether the ratio S of the first designed value to the existing learning data Z is ¾. That is, the calculator 250 can calculate whether the number of the existing learning data Z is greater than the first setting value (operation S310).

When the number of the existing learning data Z is greater than the first setting value, the calculator 250 can differentiate the weight applied to the existing learning data Z and the new data Xs3, respectively, by determining whether the number of the new data Xs3 is greater than the second designed value. The first setting value is defined as a number less than the first designed value and a number greater than the second designed value (operation S330). When the number of the new data Xs3 is greater than the second designed value, the data sampler 270 can sample the existing learning data Z so that the number of the existing learning data Z matches the first setting value and sample the new data Xs3 so that the number of the new data Xs3 is a number obtained by subtracting the first setting value from the first designed value (operation S350). When the number of the new data Xs3 is equal to or less than the second designed value, the calculator 250 can determine whether the sum of the number of the existing learning data Z and the number of the new data Xs3 is greater than the first designed value (operation S360). When the sum of the number of the existing learning data Z and the number of the new data Xs3 is greater than the first designed value, the data sampler 270 can sample only the existing learning data Z so that the sum of the number of the existing learning data Z and the number of the new data Xs3 becomes the first designed value (operation S370). When the sum of the number of the existing learning data Z and the number of the new data Xs3 is equal to or less than the first designed value, the data sampler 270 cannot perform the sampling procedure. That is, when the sum of the number of the existing learning data Z and the number of the new data Xs3 is equal to or less than the first designed value, the new learning data Xm can be generated by combining the existing learning data Z with the new data Xs3 without the sampling procedure.

When the number of the existing learning data Z is less than the first designed value and the ratio S of the first designed value to the existing learning data Z is equal to or less than ¾, the calculator 250 can determine whether the number of the new data Xs3 is greater than the second designed value (operation S410). When the number of the new data Xs3 is equal to or less than the second designed value, the data sampler 270 cannot perform the sampling procedure. That is, the new learning data Xm can be generated by combining the existing learning data Z with the new data Xs3 without the sampling procedure. When the number of the new data Xs3 is greater than the second designed value, the calculator 250 can determine whether the sum of the number of the existing learning data Z and the number of the new data Xs3 is greater than the first designed value (operation S430). When the sum of the number of the existing learning data Z and the number of the new data Xs3 is greater than the first designed value, the data sampler 270 can sample only the new data Xs3. In this case, because the number of the existing learning data Z is less than the first setting value, all the existing learning data Z can be applied to the new learning data Xm. That is, the weight applied to the existing learning data Z can be greater than the weight applied to the new data Xs3. Specifically, the weight applied to the existing learning data Z can be 1 (operation S450). When the sum of the number of the existing learning data Z and the number of the new data Xs3 is equal to or less than the first designed value, the data sampler 270 cannot perform the sampling procedure. That is, the new learning data Xm can be generated by combining the existing learning data Z with the new data Xs3 without the sampling procedure.

When the existing learning data Z is not used to generate the new learning data Xm or when the existing learning data Z is not present, the new learning data Xm can be generated by using only the new data Xs3. The calculator 250 can determine whether the number of the new data Xs3 is greater than the first designed value (operation S510). When the number of the new data Xs3 is greater than the first designed value, the data sampler 270 can filter the new data Xs3 so that the number of the new data Xs3 is equal to the first designed value (operation S5300. When the number of the new data Xs3 is equal to or less than the first designed value, the data sampler 270 cannot perform the sampling procedure.

While not restricted thereto, an exemplary embodiment can be embodied as computer-readable codes on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, an exemplary embodiment may be written as a computer program transmitted over a computer-readable transmission medium, such as a carrier wave, and received and implemented in general-use or special-purpose digital computers that execute the programs. Moreover, it is understood that in exemplary embodiments, one or more units of the above-described apparatuses and devices may include or be implemented by circuitry, a processor, a microprocessor, etc., and may execute a computer program stored in a computer-readable medium.

While exemplary embodiments have been described with reference to the accompanying drawings, it is to be understood by those skilled in the art that various modifications in form and details may be made therein without departing from the sprit and scope as defined by the appended claims. Therefore, the description of the exemplary embodiments should be construed in a descriptive sense only and not to limit the scope of the claims, and many alternatives, modifications, and variations will be apparent to those skilled in the art.

What is claimed is:

1. A system for generating learning data, the system comprising a microprocessor configured to execute computer program steps of:
receiving from a user a selection of plant data measured for a specific period of operation of a plant and a selection of essential parameters for generating a prediction model of the plant, the essential parameters including at least two of a minimum output, a maximum output, a turbine speed, a temperature, a humidity, and a pressure of one configuration of the plant;
generating new data by filtering the plant data selected by the user, the filtering based on at least one warning condition to incorporate the plant data for the one configuration of the plant into existing learning data;
differentiating a weight applied to the new data and the existing learning data, respectively, by comparing a size of the new data and a size of the existing learning data, the comparing including determining whether or not the size of the existing learning data is less than a first designed value;
changing the weight applied to the new data and weight applied to the existing learning data, respectively, according to a ratio between the size of the new data and the size of the existing learning data; and
generating new learning data by combining the new data with the existing learning data to which the weight is applied,
wherein, if the size of the existing learning data is less than the first designed value, the microprocessor is further configured to sample the existing learning data and the new data so that a sum of the size of the existing learning data and the size of the new data becomes the first designed value,
wherein, if the size of the existing learning data is not less than the first designed value, the microprocessor is further configured to sample the existing learning data and the new data by differentiating the respectively applied weights based on whether the ratio is less than or equal to 0.25,
wherein, if the ratio is less than or equal to 0.25, the microprocessor is further configured to
sample the existing learning data so that the size of the existing learning data matches a first setting value,
sample the new data so that the size of the new data is a number obtained by subtracting the first setting value from the first designed value, and
generate the new learning data by combining the sampled existing learning data and the sampled new data, and
wherein the microprocessor is further configured to provide the new learning data as a recommendation to the user.

2. The system of claim 1,
wherein when the size of the existing learning data is not less than the first designed value, the first setting value is the size of the existing learning data included in the new learning data.

3. The system of claim 1,
wherein the first setting value is a number less than the first designed value and greater than a second designed value, and
wherein, if the size of the existing learning data exceeds a first setting value, the microprocessor is further configured to differentiate the weight applied to the existing learning data and the new data, respectively, by determining whether or not the size of the new data is less than the second designed value.

4. The system of claim 3, wherein, if the size of the new data is not less than the second designed value, the microprocessor is further configured to
sample the existing learning data so that the size of the existing learning data matches the first setting value, and
sample the new data so that the size of the new data is a number obtained by subtracting the first setting value from the first designed value.

5. The system claim 1, wherein, if the size of the existing learning data is less than or equal to the first setting value and if the size of the new data is greater than a second designed value, the microprocessor is further configured to sample the new data so that the size of the new data is a number obtained by subtracting the size of the existing learning data from the first designed value.

6. The system of claim 1, wherein, if the size of the existing learning data is less than the first designed value and if a sum of the size of the existing learning data and the size of the new data is less than the first designed value, the microprocessor is further configured to generate the new learning data by combining the existing learning data and the new data.

7. The system of claim 1, wherein the microprocessor is further configured to
sample the new data so that the size of the new data becomes less than or equal to the first designed value, and
generate the new learning data by using the sampled new data.

8. The system of claim 1,
wherein the at least one warning condition comprises a first warning condition and a second warning condition,
wherein the plant data is filtered based on the first warning condition, and
wherein the new data is generated by filtering the filtered plant data based on the second warning condition.

9. The system of claim 8,
wherein the plant data is further filtered based on a feature condition in addition to the first warning condition,
wherein the further filtered plant data includes a normal distribution, and data deviating from the normal distribution is removed from the further filtered plant data,
wherein the feature condition is set based on a parameter for one configuration of the plant, and
wherein the first warning condition is a condition for filtering data outside an allowable range of a measured value based on a measured value of the plant data.

10. The system of claim 8, further comprising:
determining whether the plant data is data that is used in the prediction model; and
filtering the plant data that is used in the prediction model based on the second warning condition, and
wherein the prediction model is a model that is generated based on the existing learning data.

11. The system of claim 10,
wherein the filtering the data that is used in the prediction model includes defining a value obtained by subtracting a predicted value from a measured value as a residual by defining the plant data as the measured value and defining the data obtained by the prediction model as the predicted value, and wherein the second warning condition is a condition for filtering the data outside an allowable range of the residual.

12. The system of claim 8, further comprising:
generating a learning data candidate group; and
generating the new learning data based on the learning data candidate group.

13. The system of claim 12, wherein the generating the learning data candidate group includes filtering the existing learning data based on the first warning condition.

14. The system of claim 1, wherein the differentiating comprises:
determining whether the existing learning data is present;
calculating the ratio of the new data to the existing learning data and calculating the weight applied to the new data and the existing learning data, respectively, based on the ratio; and
sampling the new data and the existing learning data based on the ratio and the weight.

15. The system of claim 14, wherein, when the existing learning data is not present, the new data is sampled so that the size of the new data becomes less than or equal to the first designed value.

16. The system of claim 14,
wherein the weight applied to the new data is calculated as 1 when the size of the new data is less than or equal to a second designed value,
wherein all the new data is used to generate the new learning data without sampling the new data,
wherein the second designed value is a number smaller than the first designed value, and
wherein a maximum value of the weight applied to the new data and the existing learning data is 1.

17. The system of claim 1, further comprising:
generating the prediction model of the plant by modeling the generated new learning data; and
updating an existing plant prediction model by periodically receiving the new learning data and performing a plant modeling.

\* \* \* \* \*